Feb. 17, 1970  C. F. LOGSTON, JR  3,496,414
POWER SUPPLY FAULT DETECTION SYSTEM
Filed March 13, 1968

INVENTOR.
Charles F. Logston, Jr.
BY
C. L. Meland
ATTORNEY

United States Patent Office 3,496,414
Patented Feb. 17, 1970

3,496,414
POWER SUPPLY FAULT DETECTION SYSTEM
Charles F. Logston, Jr., Westmont, Ill., assignor to General Motors Corporation, Detroit, Mich., a corporation of Delaware
Filed Mar. 13, 1968, Ser. No. 712,844
Int. Cl. H02h 7/06, 7/08, 7/10
U.S. Cl. 317—13          7 Claims

ABSTRACT OF THE DISCLOSURE

This invention relates to a fault detection system for detecting various types of fault conditions in a power supply system for the traction motors of a locomotive. The system utilizes an alternating current generator having a plurality of three-phase Y-connected windings which are connected respectively with a plurality of three-phase full wave bridge rectifier networks. The DC output terminals of the rectifier networks are connected in parallel and supply the traction motors of a locomotive through ungrounded power supply conductors. The fault detecting portion of the system includes an electrically energizable control device connected between the neutrals of the three-phase windings with one end of the control device grounded. When a fault condition is detected the system is capable of opening the field circuit of the generator.

---

This invention relates to a fault detecting system for power supply systems of the type utilizing an alternating current generator having a rectified direct current output. In one type of power supply system for direct current traction motors an alternating current generator is provided which has a plurality of three-phase Y-connected windings which are connected with a plurality of three-phase full wave bridge rectifier networks. The DC terminals of the bridge rectifier networks are connected to ungrounded power supply conductors which in turn feed direct current traction motors.

In the type of power supply system that has just been described it is important to be able to detect certain fault conditions in the system and to take certain protective measures to protect the system once a fault condition is detected. It accordingly is one of the objects of this invention to provide a fault detecting system which is capable of detecting a number of fault conditions in the system and then opening the field circuit of the generator when the fault is sensed. The fault detecting system of this invention is capable of detecting a ground on the direct current side of the bridge rectifiers, is capable of detecting a ground on the AC side of the bridge rectifiers, is capable of detecting a diode failure in one of the bridge rectifiers, is capable of detecting single phase operation of the generator and is capable of detecting traction motor flashover.

Another object of this invention is to provide a detecting system which includes an electrically energizable control device connected between the neutrals of two three-phase Y-connected windings of the generator. One side of the control device is grounded and the power supply conductors connecting the traction motors and the bridge rectifiers are ungrounded. The system is arranged such that when the direct current or alternating current side of the bridge rectifiers becomes grounded the control device is supplied with current to therefore detect the faulty condition. By connecting this same control device between the neutrals of the polyphase windings of the generator it is also possible to detect single phase operation since in this case there will be a difference in potential between the neutrals to cause current to flow through the device. The neutral-to-neutral connection for the control device is also capable of detecting diode failures in the bridge rectifier networks.

The control device can take the form of a transformer having a primary winding connected between the neutrals of the polyphase windings and having a secondary which is operative to trigger a control circuit when a fault condition is detected. The control device can take other forms and may be a bridge rectifier network comprised of a plurality of selenium suppression rectifiers.

Figure 1:
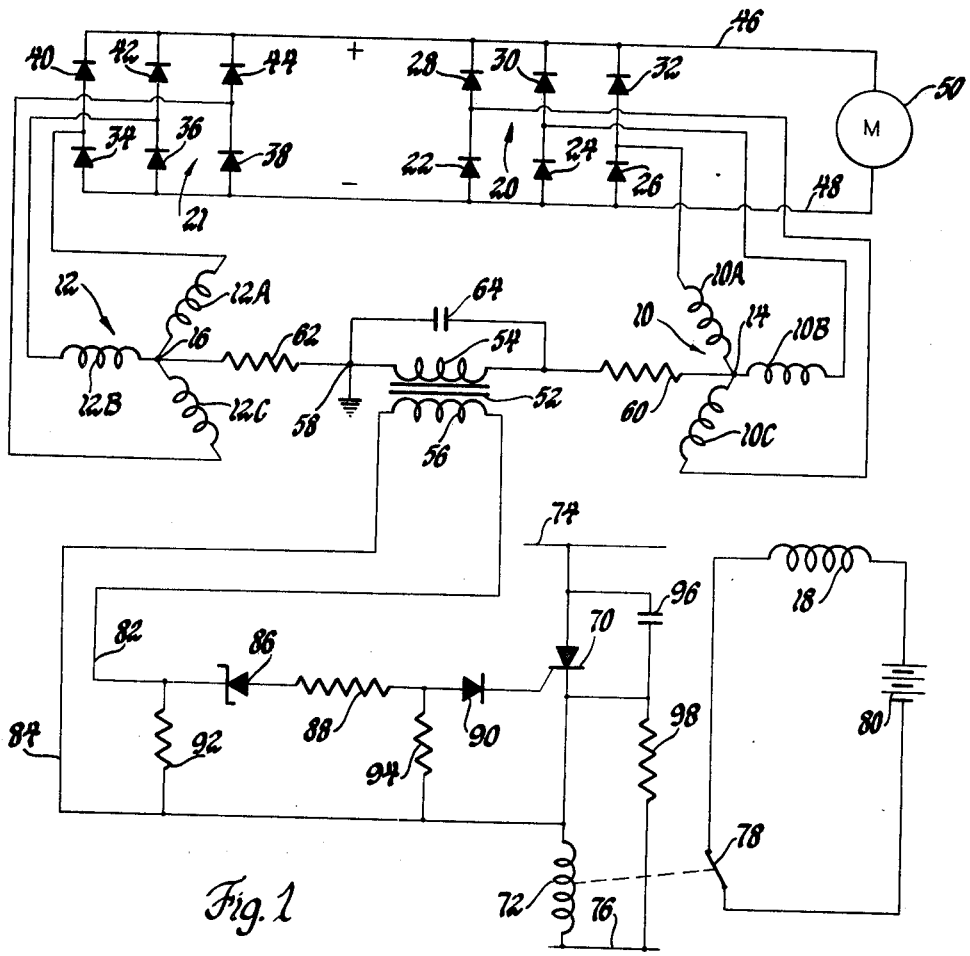
Figure 2:
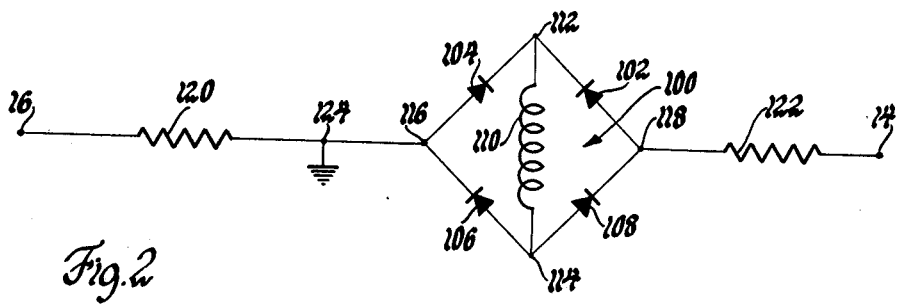

In the drawings:
FIGURE 1 is a schematic circuit diagram of a fault detecting system made in accordance with this invention.
FIGURE 2 is a schematic diagram of a modified control device which can be utilized in the system of FIGURE 1.

Referring now to the drawings and more particularly to FIGURE 1, the reference numerals 10 and 12 designate three-phase Y-connected windings for an alternating current generator. The winding 10 is comprised of phase windings 10A, 10B and 10C which are connected to the neutral 14. The winding 12 is comprised of phase windings 12A, 12B and 12C connected together at the neutral 16. The polyphase windings 10 and 12 are wound on the same stator and are wound such that the voltages induced in phase windings 10A and 12A, 10B and 12B and 10C and 12C are in phase. This generator preferably has a salient pole rotor including a field winding 18 and the rotor is driven by a suitable prime mover such as a diesel engine in a locomotive application.

The polyphase winding 10 is connected with a bridge rectifier 20 including silicon diodes 22, 24, 26, 28, 30 and 32 which are connected in a three-phase full wave arrangement. In a similar fashion the polyphase winding 12 is connected with diodes 34, 36, 38, 40, 42 and 44 which are also connected in a three-phase full wave arrangement to provide bridge rectifier 21. The DC output terminals of the two bridge rectifiers are connected to power supply conductors 46 and 48 which are not grounded and which serve to feed one or more direct current traction motors 50 that propel the locomotive.

The fault detection system of this invention is connected between the neutrals 14 and 16 and includes an electrically energizable control device designated by reference numeral 52. This control device, in the FIGURE 1 embodiment, takes the form of a transformer having a primary winding 54 and a secondary winding 56. One end of the primary winding 54 is grounded at junction 58 and the purpose of this grounded connection will be more fully described hereinafter. The ends of the primary winding 54 are connected, respectively, to the neutrals 14 and 16 via resistors 60 and 62. A capacitor 64 is connected across the primary winding 54 which serves to shunt the primary winding 54 for small currents passing between the neutrals.

The secondary winding 56 will develop a signal voltage whenever a fault condition exists in the system and this signal voltage is utilized to trigger a control device which will now be described. This control device includes a switching device 70 which takes the form of a controlled rectifier. The anode-cathode circuit of the controlled rectifier is connected in series with a relay coil 72 across conductors 74 and 76 which have a suitable source of direct current connected therewith (not shown). It can be seen that whenever the controlled rectifier is gated conductive the relay coil 72 will be energized. The relay coil 72 operates a switch contactor 78 which controls the energization of the generator field 18 from the source of direct current 80. The source of direct current 80 can take various forms and for the purpose of this application has been illustrated as a battery although it will be appreciated that it could be the rectified output of a generator.

The relay coil 72 can be utilized to operate any conventional type of alarm device in addition to opening the field circuit of the generator when a fault condition is detected. This alarm device can be placed in the cab of the locomotive to warn the operator of the faulty condition.

The trigger circuit for the controlled rectifier 70 is fed from conductors 82 and 84 connected across secondary winding 56. A Zener diode 86, a resistor 88 and a diode 90 are connected in series between conductor 82 and the gate of the controlled rectifier 70. The gate circuit further includes resistors 92 and 94. A capacitor 96 is connected across the anode and cathode of controlled rectifier 70 and is connected in series with a resistor 98.

When a voltage is induced in secondary winding 56 of a sufficient magnitude the controlled rectifier 70 will be gated to a conductive condition. When this voltage reaches a predetermined magnitude the Zener diode 86 will break down in a reverse direction and gate current will then be supplied to the controlled rectifier 70 through diode 90. This will turn on the controlled rectifier 70 to energize the relay coil 72 and therefore open the field circuit of the alternating current generator in addition to energizing any alarm device controlled by relay coil 72.

The resistor 92 and the Zener diode 86 determine the sensitivity level for actuating controlled rectifier 70. The resistors 88 and 94 determine the proper current and voltage for the gate of the controlled rectifier. The diode 90 prevents reverse current from flowing in the gate circuit of the controlled rectifier 70 and the capacitor 96 prevents false firing of the controlled rectifier 70 due to any transient voltages between lines 74 and 76. The resistor 98 which shunts the inductive relay coil 72 provides a path for anode-cathode current and serves to provide sufficient holding current for the controlled rectifier when it is gated on.

Once the fault has been detected to turn on the controlled rectifier 70, it can be turned off by either removing the voltage across conductors 74 or 76 or temporarily disconnecting the controlled rectifier from one of the power lines 74 and 76 by a suitable switch (not shown) after the fault condition has been repaired.

The various faults which can be detected by the system of FIGURE 1 will now be described. If the positive DC power supply conductor 46 should become grounded the primary winding 54 of the transformer will be energized to trigger the controlled rectifier 70. This circuit for energizing primary winding 54 can be traced from an assumed grounded conductor 46, to grounded junction 58, through primary 54, through resistor 60, through neutral 14 and the phase windings, and then through diodes 28, 30 and 32 to the power supply conductor 46. It will be appreciated that during this condition of operation the primary 54 is fed with a half cycle pulsating direct current and as a result of this an alternating current is induced in the secondary winding 56. This means that the Zener diode 86 will be triggered conductive to turn on controlled rectifier 70 on the half cycle applied to lines 82 and 84 when line 82 is positive with respect to line 84.

In the event that the negative DC power supply conductor 48 should become grounded this condition will be detected by current flowing in a path including neutral 14, resistor 60, primary winding 54, grounded junction 58, the assumed grounded conductor 48 and then through diodes 22, 24 and 26 to the phase windings of polyphase winding 10. In the mode of operation just described the direction of current flow through primary winding 54 has reversed from its direction of flow when DC power supply conductor 46 was grounded but since this is a pulsating direct current an alternating current is induced in secondary winding 56 of sufficient magnitude to trigger the controlled rectifier 70 conductive.

The system of FIGURE 1 is capable of detecting a ground on the AC side of the bridge rectifiers. For example, if the phase winding 12A should become grounded at its end opposite the neutral 16, the primary 54 will be energized to actuate the controlled rectifier 70. If phase winding 12A becomes grounded the circuit for energizing primary 54 can be traced from the grounded side of phase winding 12A to grounded junction 58, through winding 54, through resistor 60, through phase winding 10A of polyphase winding 10, through diode 32, through the motor 50, and then through diode 36 to phase winding 12B to the neutral end of phase winding 12A. When the end of phase winding 12A becomes grounded there is, of course, another current path developed which is from the assumed grounded end of phase winding 12A to junction 58 and then through resistor 62 to the neutral 16. There is sufficient current supplied to the winding 54 however to actuate the control device even though the other current path is set up. Similar current paths can be traced in the event that phase windings 12B or 12C become grounded.

The system of this invention will also detect a condition where the end of any of the phase windings 10A, 10B or 10C becomes grounded. Assuming that phase winding 10A is grounded the current path for energizing primary winding 54 is from the end of phase winding 10A, through grounded junction 58, through primary winding 54, through resistor 60 and then to the neutral 14 of polyphase winding 10 and therefore to the opposite side of phase winding 10A. In this case an alternating current as applied to primary 54.

If a diode, for example, diode 44 should fail by shorting, the system will energize the controlled rectifier 70. This current path can be traced from the positive side of bridge rectifier 20 through the assumed shorted diode 44 in a reverse direction, through phase winding 12C, through resistor 62, through primary 54, and then through resistor 60 to the neutral of the polyphase winding 10.

If a negative diode becomes shorted, for example, diode 38 the primary winding 54 is again energized. This circuit can be traced from phase winding 12C, through diode 38 in a reverse direction, through diodes 24 and 26 and phase windings 10A and 10B to neutral 14, and then through resistor 60, primary 54 and resistor 62 to neutral 16.

Diode failures in the bridge rectifier 20 will be detected by current paths similar to those described for diode failures in bridge rectifier 21.

The FIGURE 1 system will also indicate single phase operation of either polyphase winding 10 or 12. If either winding 10 or 12 develops a single phase output rather than the normal polyphase output current will flow between the neutrals 14 and 16 to energize the primary 54. This will cause the controlled rectifier to be gated to a conductive condition to therefore open the field circuit of the generator.

The fault detecting system of FIGURE 1 is also capable of detecting commutator flashover in the traction motor 50 where flashover is defined as a sudden high current arc between one of the brushes of the motor and ground. If this arc to ground takes place, the flashover is quickly detected by current flowing through the grounded junction 58 and primary 54.

Referring now to FIGURE 2 a modified control circuit is illustrated which can be connected between the neutrals 14 and 16 of the polyphase windings 10 and 12. In the FIGURE 2 embodiment a bridge detection circuit is provided which takes the form of a bridge rectifier 100 comprised of selenium suppression rectifiers 102, 104, 106 and 108. A relay coil 110 is connected between junctions 112 and 114 which form output terminals for bridge 100 and this relay coil will perform the same function as relay coil 72 shown in FIGURE 1. The selenium suppression rectifiers utilized in the bridge 100 are of the type that conduct forward current but are also of the type that will conduct in a reverse direction once their reverse breakover voltage is exceeded without damage to the rectifier. The use of this type of rectifier in the bridge circuit provides a system that will protect the relay coil 110 since excessive voltages applied to the bridge circuit will result in a bypassing of the relay coil 110 to a certain degree. It will be appreciated however that other types of rectifiers or diodes such as silicon diodes could be used in the system but when they are used they must have a reverse blocking voltage above the maximum voltage that would be applied to them during use of the system.

In the system of FIGURE 2 the input terminals 116 and 118 of the bridge circuit are connected between the neutrals 16 and 14 through resistors 120 and 122. The junction 124 is grounded and performs the same function as the grounded junction 58 in the FIGURE 1 system.

The operation of the FIGURE 2 system will only be described in regard to one type of fault condition since the other faults will apply a potential across junctions 116 and 118. In this regard the bridge 100 responds to direct current of either polarity and to alternating current.

If the power supply conductor 46 becomes grounded the system of FIGURE 2 will detect this condition by current flow from grounded conductor 46, through grounded junction 124, through diode 104, through relay coil 110, through diode 108, and then through resistor 122 and the neutral 14 of polyphase winding 10 to the power supply conductor 46. Similar current paths can be traced for other faults and the bridge circuit is arranged such that it can pass current in either direction between junctions 116 and 118 depending upon the relative polarity of these junctions with current flow remaining in the same direction through relay coil 110.

The faults that can be detected by the FIGURE 2 embodiment depend upon the electrical parameters of the system including the sensitivity of relay coil 110. In actual tests the FIGURE 2 embodiment was capable of detecting all the faults detected by the FIGURE 1 system with the exception of shorted diodes.

Although only two three-phase windings 10 and 12 have been illustrated and only two bridge rectifiers for these phase windings the fault detecting system of this invention can be used where there are more than two three-phase windings such as in the system disclosed in the United States patent to Thiessen 3,340,448, issued on Sept. 5, 1967. Thus, the fault detecting system of this invention can be utilized in the system disclosed at column 3, lines 32 through 34 of the Thiessen patent where the positive and negative terminals of the two banks of rectifiers are connected together. In such a system the fault detecting circuit is connected across conductors 34 and 36 disclosed in the Thiessen patent.

What is claimed is as follows:

1. A detection system for detecting fault conditions in a power supply system comprising, an alternating current generator having a plurality of polyphase windings, each polyphase winding having a neutral, a polyphase bridge rectifier network having AC input terminals connected respectively with each polyphase winding and having direct current output terminals, ungrounded power supply conductors connected with the direct current output terminals of said rectifier networks, an electrical load connected across said power supply conductors, an electrically energizable control device connected between said neutrals of said polyphase windings, a junction connected between one of said neutrals and one end of said control device, and means connecting said junction to an electrical ground of said power supply system, said electrically energizable control device being energized by a fault condition in said power supply system.

2. A fault indicator for indicating fault conditions in a power supply system comprising, an alternating current generator having a plurality of polyphase windings each having a neutral, a plurality of rectifier networks each connected respectively with a polyphase winding, ungrounded power supply conductors connecting the direct current output terminals of said rectifier networks, an electrical load connected across said power supply conductors, a transformer having a primary and a secondary, means connecting said primary between said neutrals of said polyphase windings, and means grounding one end of said primary winding to provide a current path for energizing said primary winding when the DC or AC side of said bridge rectifiers become grounded.

3. A power supply system comprising, an alternating current generator having a plurality of polyphase windings which have voltages induced therein that are in phase with each other, each of said windings having a neutral connection, a field winding for said generator, a field circuit for said generator including the field winding of said generator, a plurality of bridge rectifier networks equal in number to said polyphase windings connected respectively with said polyphase windings, ungrounded power supply conductors connecting the DC output terminals of said bridge rectifiers, an electrically energizable control device connected between said neutrals of said polyphase windings, means grounding one end of said control device, and means for opening said field circuit of said generator in response to the electrical energization of said control device.

4. A fault detecting system for a locomotive power supply system comprising, an alternating current generator having a plurality of polyphase windings each having a neutral connection, said generator having a field winding, a field circuit connected with said field winding, a plurality of bridge rectifier networks equal in number to said polyphase windings connected respectively with said polyphase windings, said rectifier networks having DC output terminals connected with ungrounded power supply conductors, at least one traction motor for said locomotive connected across said power supply conductors, and electrically energizable control device connected between the neutrals of said polyphase windings, one end of said electrically energizable control device being connected to ground to provide a current path for energizing said control device when the AC or DC side of a bridge rectifier becomes inadvertently grounded, and means controlled by said control device for opening said field circuit when said control device is energized.

5. A fault detecting system for an electrical system comprising, an alternating current generator having a plurality of discrete polyphase windings each having a neutral connection, a plurality of power rectifier networks equal in number to said polyphase windings and connected respectively with said polyphase windings, ungrounded power supply conductors connecting the direct current output terminals of said power rectifier networks, a bridge detection circuit comprised of a plurality of rectifiers, said bridge detection circuit having input terminals connected respectively with the neutrals of said polyphase windings and having output terminals, a relay coil connected across the output terminals of said bridge detection circuit, and means connecting one of said input terminals of said bridge detection circuit to ground.

6. The fault detecting system according to claim 5 where the rectifiers of the detection bridge are selenium suppression rectifiers.

7. A fault detecting system for a power supply system comprising, an alternating current generator having a plurality of polyphase windings each of which has a neutral connection, a plurality of bridge rectifier networks equal in number to said polyphase windings and connected respectively with said polyphase windings, ungrounded power supply conductors connecting the direct current output terminals of said bridge rectifier networks, a transformer having a primary winding and a secondary winding, means connecting said primary winding between the neutrals of said polyphase windings, means connecting one end of said primary winding to ground, a three terminal switching device having a pair of current carrying terminals and a control terminal, means connecting said secondary winding of said transformer with the control terminal and one of the current carrying terminals of said switching device, and a relay coil connected in series with said switching device, said relay coil operative to control a contact means to open the field circuit of said generator when a fault condition exists in said power supply system.

References Cited

UNITED STATES PATENTS

| | | | |
|---|---|---|---|
| 2,551,610 | 5/1951 | Kruithof | 317—13 X |
| 3,107,318 | 10/1963 | Lytle | 317—13 |
| 3,259,802 | 7/1966 | Steen | 317—18 |

FOREIGN PATENTS 512,247  8/1939  Great Britain.

J. D. TRAMMELL, Primary Examiner

W. H. BEHA, Jr., Assistant Examiner

U.S. Cl. X.R.

317—18; 321—11, 26; 322—90; 340—255